June 24, 1930.  H. W. DRENNAN  1,765,908
AUTOMATIC CLUTCH RELEASE
Filed May 24, 1929   2 Sheets-Sheet 1
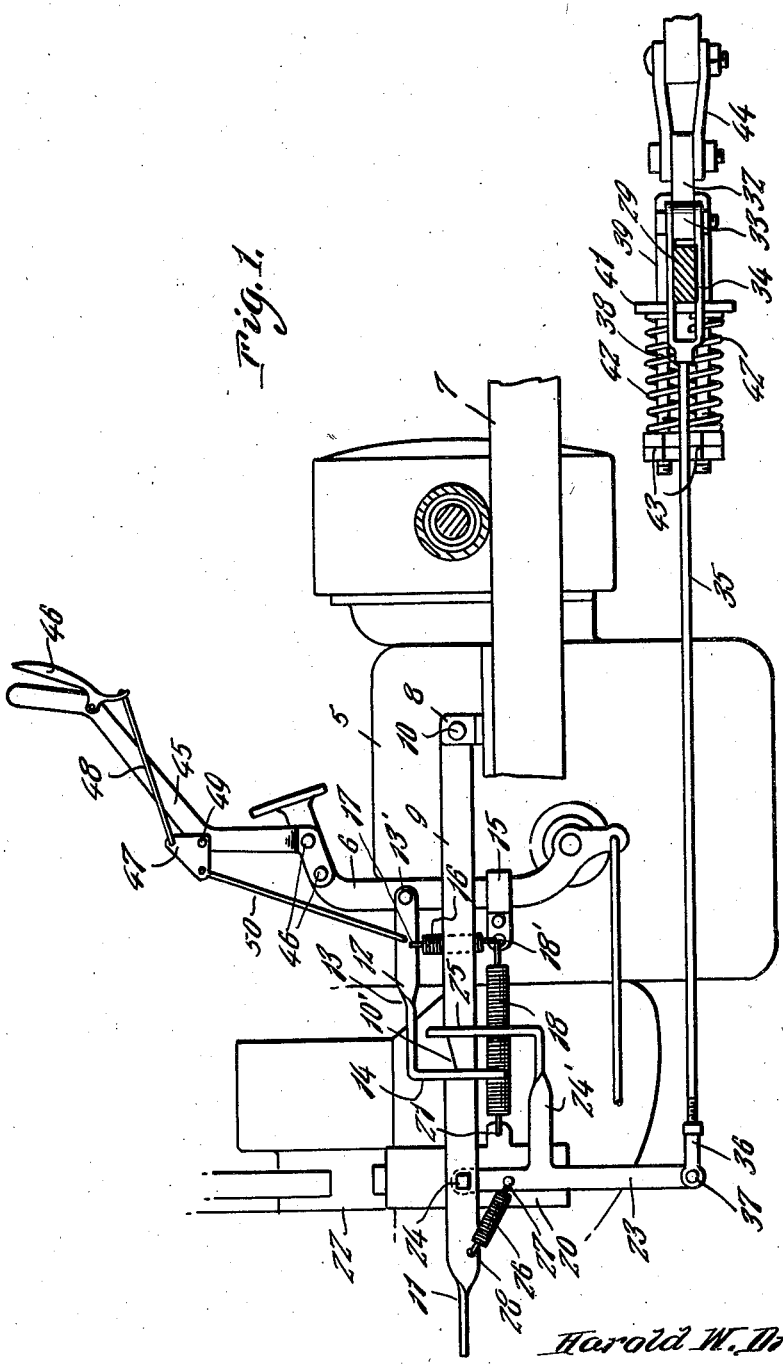
Inventor
*Harold W. Drennan,*
By *Clarence A. O'Brien*
Attorney

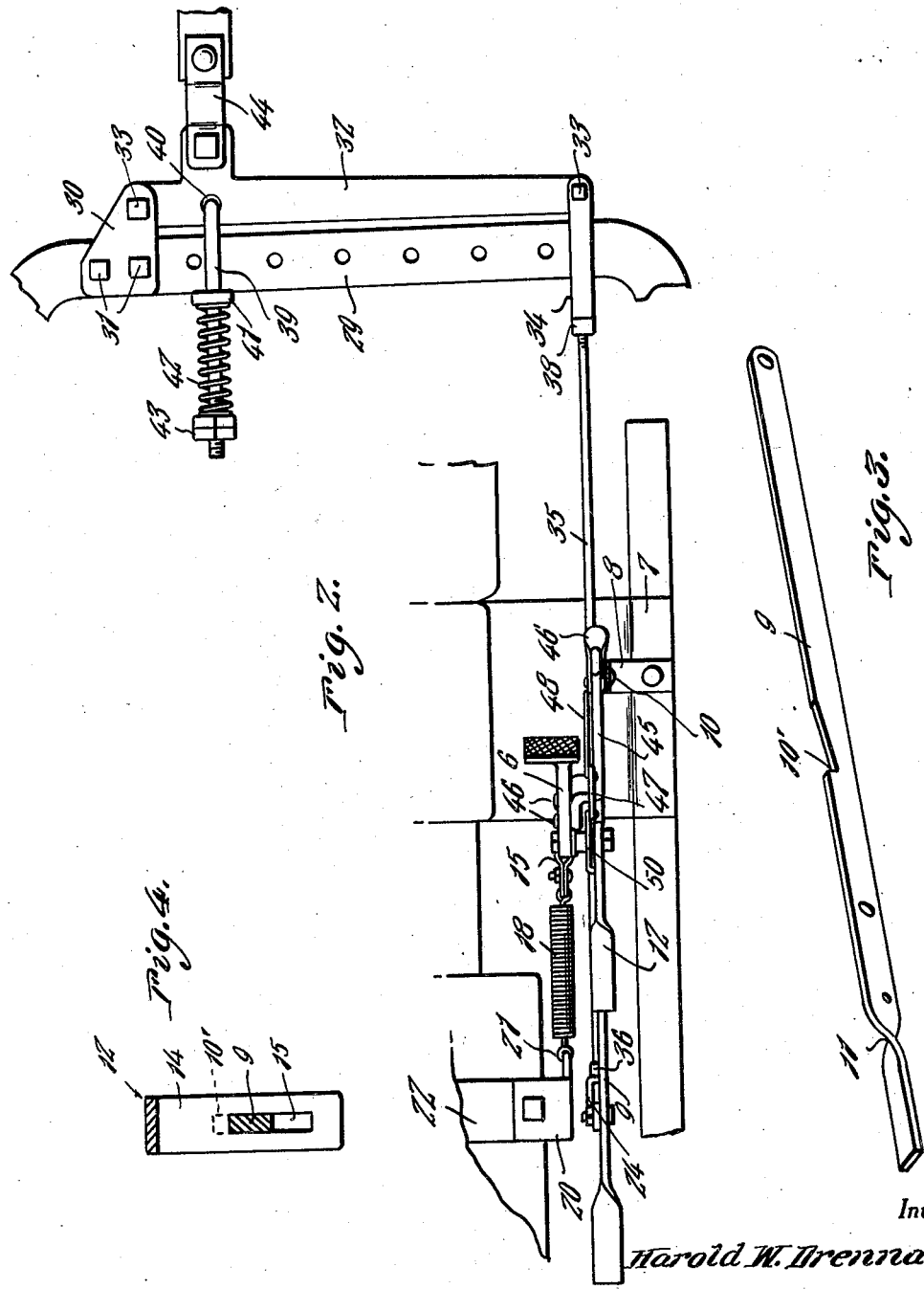

Patented June 24, 1930

1,765,908

UNITED STATES PATENT OFFICE

HAROLD W. DRENNAN, OF CONOVER, OHIO

AUTOMATIC CLUTCH RELEASE

Application filed May 24, 1929. Serial No. 365,771.

This invention relates to improvements in tractors for agricultural or other purposes and has for its primary object the provision of an automatic clutch release device, which device is adapted to be operated upon any incorrect movement of a plow or similar device which may be hitched to the rear of the tractor.

Another very important object of the invention is to provide an automatic clutch release especially adaptable for use on a McCormick Deering tractor, and which may be so associated with the tractor hitch of the plow, towed by the tractor, so that when the plow strikes solid obstacles such as stones or the like, when plowing hilly or rocky surfaces, the device will be operated to disengage the clutch, thus stopping the tractor, so as to prevent the plow from breaking loose under such conditions.

Another very important object of this invention is to provide an automatic clutch release for tractors of the character above mentioned which is very simple in construction, can be readily and easily applied to the tractor without altering the hitch of the tractor in any material manner, will be strong, durable, practical, and thoroughly reliable in use and operation.

Other objects and advantages of the invention will become apparent during a study of the following description, taken in connection with the accompanying drawings, wherein:

Figure 1 is a fragmentary side elevation of a tractor showing my improved clutch release mechanism associated therewith.

Figure 2 is a fragmentary top plan view of the same.

Figure 3 is a detail perspective view of one of the elements embodied in the invention.

Figure 4 is a detail sectional view, taken on the line 4—4 of Figure 1.

With reference more in detail to the drawing, it will be seen that the transmission housing of the tractor is designated generally by the reference character 5. As before mentioned, the tractor is preferably of the McCormick Deering Farmall tractor and the frame member 7 of the motor hanger adjacent the transmission housing 5 has a bracket 8 rising therefrom. An elongated horizontally disposed rod 9 has one end thereof secured to the bracket 8 as at 10'. It will be noted that the rod 9 extends forwardly of the tractor and along one side of the clutch pedal 6. The rod 9 intermediate its ends is provided with a notch 10 and said rod 9 adjacent its free end is twisted as at 11 to terminate in a relatively flat horizontally disposed end portion. The rod 9 is preferably formed of metal or of any other durable light material. A metallic strap member 12 has one end thereof pivoted to one side of the brake pedal 6 as at 13', and extends forwardly in spaced parallelism with the rod 9. The strap member 12 is preferably of metal and is twisted intermediate its ends as at 13 to provide a relatively flat portion, the extremity of which portion is bent downwardly to provide a right angularly disposed extension 14. The downwardly extended portion 14 is provided with a vertical slot 15, and through the slot 15 extends the rod 9 as shown to advantage in Figures 1 and 4. The notch 10 of the rod 11 engages with the downwardly disposed portion 14 of the strap 12, at the upper end of the notch 15 as clearly shown in Figure 4. A suitable clamping member 15' is disposed about the lower end of the clutch pedal 6 and a spring 16 has one end thereof engaged with the strap 12, as at 17, and the opposite end of the said spring is engaged with the clamp 15 as at 18'. Thus it will be seen that the spring 16 normally holds the strap 12 in engagement with the rod 9 through the medium of the slot 15 and notch formed in the rod 9. When the member 12 is engaged with the rod 9 in this manner as illustrated, it will be seen that the clutch pedal 6 is normally held in its engaged position.

For normally urging the clutch pedal 6 forwardly to disengage the same, I provide a coil spring 18, one end of which is fixed to the bracket 15, as shown and the opposite end fixed to a plate 20, as at 21, which plate is preferably of steel and is fixed to the fly wheel casing 22 of the tractor in any suitable manner. A rod 23 has one end thereof pivotally connected to the bar 9 adjacent its twisted end portion as at 24. This bar 23 depends downwardly from the said rod 9 and adjacent its pivotal connection the rod 23 is provided with an inwardly directed laterally extending arm 24', which terminates in a right angularly disposed riser portion 25, which riser portion 25 is slotted in a manner similar to the right angularly disposed portion 14 of the strap 12 and through the slots of the riser 25 extend the bar 9 as clearly shown in Figure 1. It is to be noted that the upper extremity of the riser 25 terminates in spaced relation to the horizontally disposed slot portion of the strap 12. To normally hold the riser 25 out of engagement with the strap 12, I provide a coil spring 26, one end of which is associated with the downwardly depending rod 23 as at 27 and the opposite end of said coil spring being fixed to the adjacent end of the rod 9 as at 28. The tractor is provided with the usual draw bar 29 and to one end of this draw bar 29 is fixed an angularly shaped plate 30 as at 31.

A horizontal bar 32 has one end pivotally connected to the plate 30, as at 33, and this bar 32 extends along one side and has one end pivotally connected to the plate 30 as at 33, and this bar 32 extends along one side of the draw bar 29 and has its opposite end secured as at 33, to a clevis 34 which straddles the draw bar 29 at the opposite end of said draw bar.

The link 35 has one end thereof adjustably associated with a coupling 36 fixed to the free end of the rod 23 as at 37. The opposite end of the link 35 is connected to the clevis as at 38. A U-bolt 39 has its bight portion extending through the rod 32, as at 40, the legs of the U-bolt 39 straddling the draw bar 39 at one end of the draw bar and adjacent the plate 30. A steel plate 41 is slidably supported on the legs of the U-bolt at one side of the draw bar 29. Coiled about each of the legs of the U-bolt is a coil spring 42, one end of which coil spring is adapted to impinge against the face 41 and the opposite end of the coil springs adapted to impinge against nuts 43, having threaded engagement with the free ends of the respective legs. The tension on the spring 42 is determined by screwing the nuts 43 upon the legs of the U-bolt just enough to permit a pull upon the plow when the plow is in the ground. The plows (not shown) to be driven by the tractor, are connected to the bar 32, through the medium of a suitable coupling 44.

From the foregoing then, it will be seen that should the plow strike a solid obstacle, the same would cause compression upon the spring 42, thus permitting the bar 32 to swing to the right of Figure 1, upon its pivotal connection with the plate 30, thus drawing the link 35 rearwardly of the tractor for actuating the rod 23, upon its pivotal connection, thus bringing the riser 25 in engagement with the strap 12, disengaging the said strap from the notch in the rod 9, whereupon it will be seen that through the action of the coil spring 18, the clutch pedal 6 will be urged forwardly, thus disengaging the clutch, resulting in a quick stopping of the tractor, and the prevention of the uncoupling of the plow with the tractor.

In order to manually reengage the clutch, I provide a hand lever 45, which is secured to the clutch pedal, as at 46, and rises upwardly and rearwardly therefrom so as to be conveniently grasped by the operator of the tractor. Pivotally connected to the upper portion of the hand lever 45 is a hand operating lever 46, which is operatively associated with an angularly bent plate 47 through the medium of a link connection 48. The plate 47 which is pivotally connected to the lever 45 as at 49, is connected to the strap member 12 through the medium of a link connection 50. Thus it will be seen that by grasping the hand lever 45 and exerting a slight pressure upon the hand operating lever 46, the strap member 12 may be again engaged with the notch on the bar 9, after the clutch pedal has been returned to its engaged position to thus retain the said clutch pedals in said engaged position.

It is believed that from the foregoing description, a thorough knowledge of the operation, construction and advantages of this device may be readily and easily obtained by those thoroughly skilled in this art, and therefore a more detailed description thereof is deemed unnecessary.

Even though I have herein shown and described, certain detailed features of my invention, it is to be understood that the invention is susceptible of certain changes fully comprehended by the spirit of the invention and the scope of the appended claims.

What is claimed as new is:

1. In a device of the character described, the combination of a tractor, embodying among other parts, a clutch pedal, spring means for normally holding said clutch pedal in a disengaged position, an elongated rod disposed on the tractor adjacent the clutch pedal, said rod having a notch formed therein, an angularly shaped strap member pivoted to the clutch pedal and adapted for engagement with the notch in said rod for holding said clutch pedal in an engaged position against the action of said spring means, said rod being provided with a downwardly depending rod pivotally associated therewith, and said last mentioned rod having a laterally extending projection merging into a riser terminating in spaced relation to said strap member, means on the tractor for coupling a plow thereto, and means operatively associating said coupling means with said last mentioned rod, whereby upon any untoward movement of the plow, said last mentioned rod will be actuated for bringing said riser into engagement with said strap member for disengaging said strap member with said first mentioned rod for permitting the said clutch pedal to assume a disengaged position.

2. In a device of the character described, the combination of a tractor, embodying among other parts, a clutch pedal, of an elongated rod horizontally disposed on the tractor and fixed rigidly thereto, said rod being disposed adjacent the clutch pedal, an angularly shaped strap member pivoted to the clutch pedal and provided with a slot through which said rod extends, and said rod being provided with a notch adapted for engagement with the strap at one end of the slot, for holding said clutch pedal in an engaged position, spring means for normally urging said clutch pedal in a disengaged position, and plow coupling control means operatively associated with said strap and adapted to disengage the strap with said rod to permit release of the clutch pedal.

3. In a device of the character described, the combination of a tractor, wherein the tractor embodies among other parts, a clutch pedal and a draw bar, of an elongated horizontally disposed rod fixed to the frame of the tractor adjacent the clutch pedals, an angularly shaped strap member pivoted to the clutch pedal and provided with a slot through which said rod extends, said rod being provided with a notch adapted for engagement with the strap at one end of a slot formed in said strap, for holding said clutch pedal in an engaged position, spring means secured to the clutch pedal and to the body of the tractor for holding said clutch pedal normally in a disengaged position, a second rod pivotally associated with and depending from one end of the first mentioned rod, said second rod having a laterally extending projection merging into a right angularly disposed riser terminating in spaced relation to said strap member, a third rod pivotally associated with the draw bar of the tractor, a plow coupling member associated with the third rod, a link connection between said third rod and the free end of said second rod.

4. In a device of the character described, the combination of a tractor, wherein the tractor embodies among other parts a clutch pedal and a draw bar, of a horizontally disposed elongated rod fixed to the tractor, adjacent the clutch pedal, an angularly shaped strap member pivoted to the clutch pedal and provided with a slot through which said rod extends, said rod being provided with a notch adapted for engagement with the strap at one end of the slot for holding said clutch pedal in an engaged position, spring means for normally urging said clutch pedal into a disengaged position, spring means for holding said strap in engagement with said rod, a second rod pivotally associated with and depending from one end of the first mentioned rod, said second mentioned rod being provided with a laterally extending projection merging into a riser terminating in spaced relation to said strap member, spring means associated with said second rod and said first rod for holding said riser out of engagement with said strap, a bar pivotally associated with the draw bar of the tractor, spring means operatively associated with said bar and said draw bar for normally urging said bar inwardly of the draw bar, plow coupling means associated with said bar, and an adjustable link connection between the free end of said bar and a free end of said second rod.

5. In a device of the character described, the combination of a tractor, wherein the tractor embodies among other parts, a clutch pedal, of an elongated rod horizontally disposed on the tractor and fixed thereto adjacent the clutch pedal, an angularly shaped strap member pivoted to the clutch pedal and adapted to engage with the rod for holding the clutch pedal in an engaged position, spring means for normally urging the clutch pedal out of engaged position, a second rod depending from one end of the first mentioned rod and pivotally associated therewith, said second rod having a laterally extending projection for merging into a riser terminating in spaced relation to said strap member, plow coupling means associated with the tractor, means operatively associated with said plow coupling means and with the free end of said second rod for actuating said second rod to permit an engagement of the riser with said strap member to disengage said strap member with said first mentioned rod, means for permitting the clutch pedal to assume a disengaged position, a hand lever rising from the clutch pedal, and means operatively associated with said hand lever and said strap to facilitate the engagement of the strap with said rod.

6. In a device of the character described, the combination of a tractor, embodying among other parts a clutch pedal, spring means for normally holding said clutch pedal in a disengaged position, a bar pivotally mounted at one end on the tractor, said bar having a notch formed therein, a member pivotally engaged at one end with said clutch pedal and having its opposite end adapted for engagement with the notch for holding said clutch pedal in engaged position against the action of said spring means, means on the tractor for coupling a plow thereto, and means operatively connecting said coupling means with the first mentioned rod, whereby upon any untoward movement of the plow, said first mentioned plow will be actuated for moving said notch out of engagement with the bar pivoted to the clutch pedal for permitting said clutch pedal to assume a disengaged position under the action of said spring means.

7. In a device of the character described, the combination of a tractor, embodying among other parts a clutch pedal, spring means for normally holding said clutch pedal in a disengaged position, a bar pivotally mounted at one end on the tractor, said bar having a notch formed therein, a member pivotally engaged at one end with said clutch pedal and having its opposite end adapted for engagement with the notch for holding said clutch pedal in engaged position against the action of said spring means, means on the tractor for coupling a plow thereto, and means operatively connecting said coupling means with the first mentioned rod, whereby upon any untoward movement of the plow, said first mentioned plow will be actuated for moving said notch out of engagement with the bar pivoted to the clutch pedal for permitting said clutch pedal to assume a disengaged position under the action of said spring means, said coupling means comprising a stationary draw bar, a bar pivotally associated with the draw bar, a link adjustably connected at one end with the free end of said last mentioned bar, said link constituting a part of the referred to means operatively associating the coupling means with the notched rod.

In testimony whereof, I affix my signature.

HAROLD W. DRENNAN.